C. WEAVER.
AIR VALVE.
APPLICATION FILED JAN. 26, 1912.
1,166,503.
Patented Jan. 4, 1916.
3 SHEETS—SHEET 1.
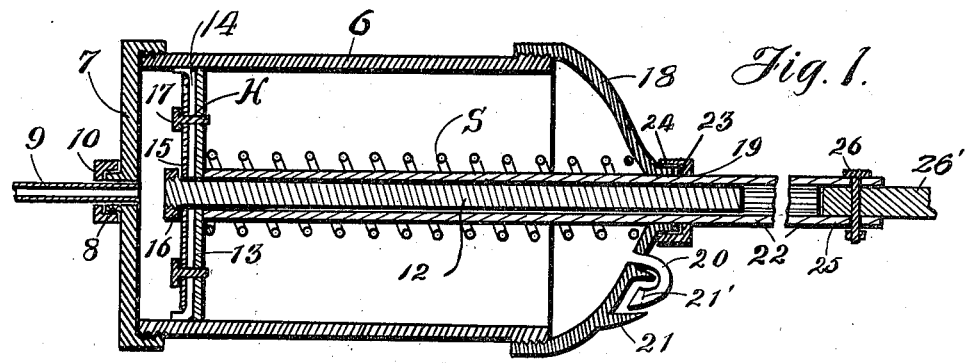
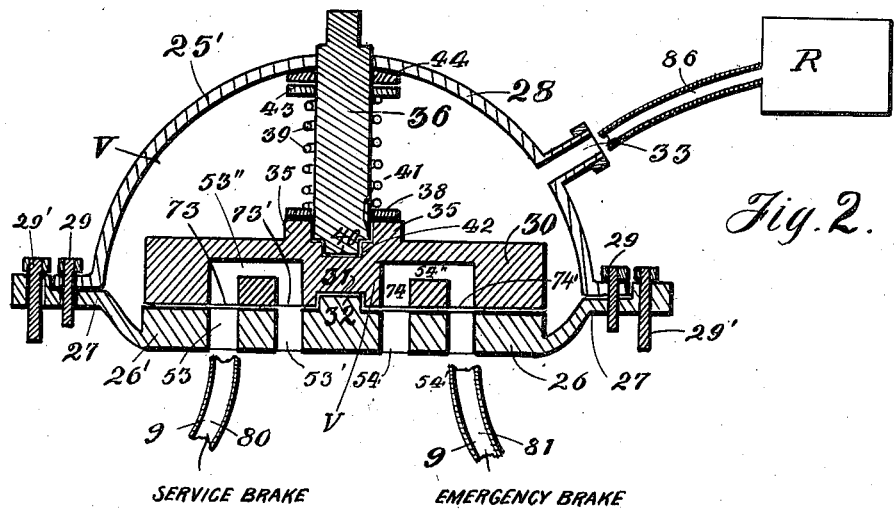
SERVICE BRAKE   EMERGENCY BRAKE
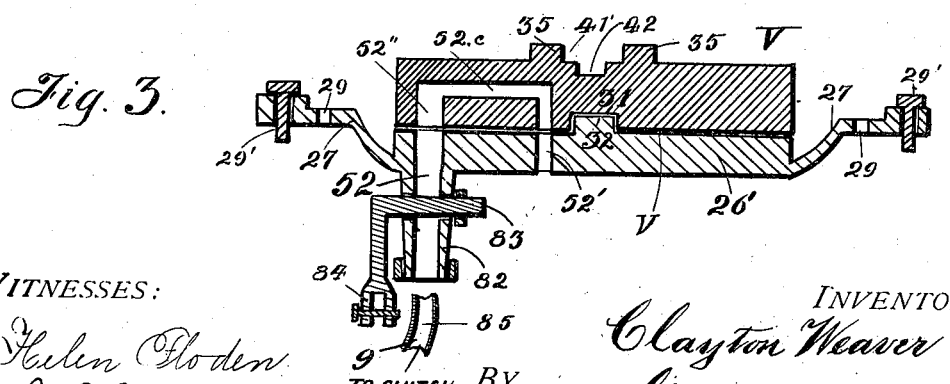
WITNESSES:
Helen Floden
J. B. Cole.
INVENTOR
Clayton Weaver
Geo. W. Upton
BY
Attorney

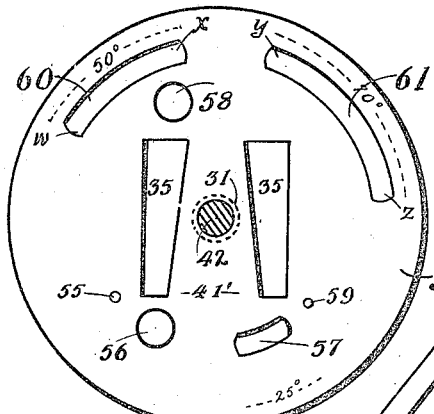
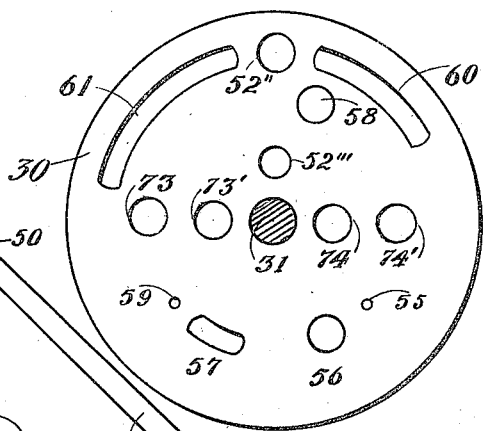
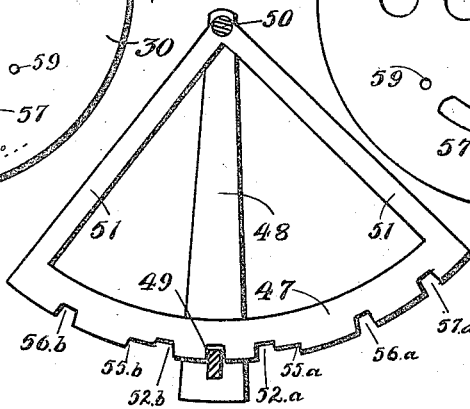
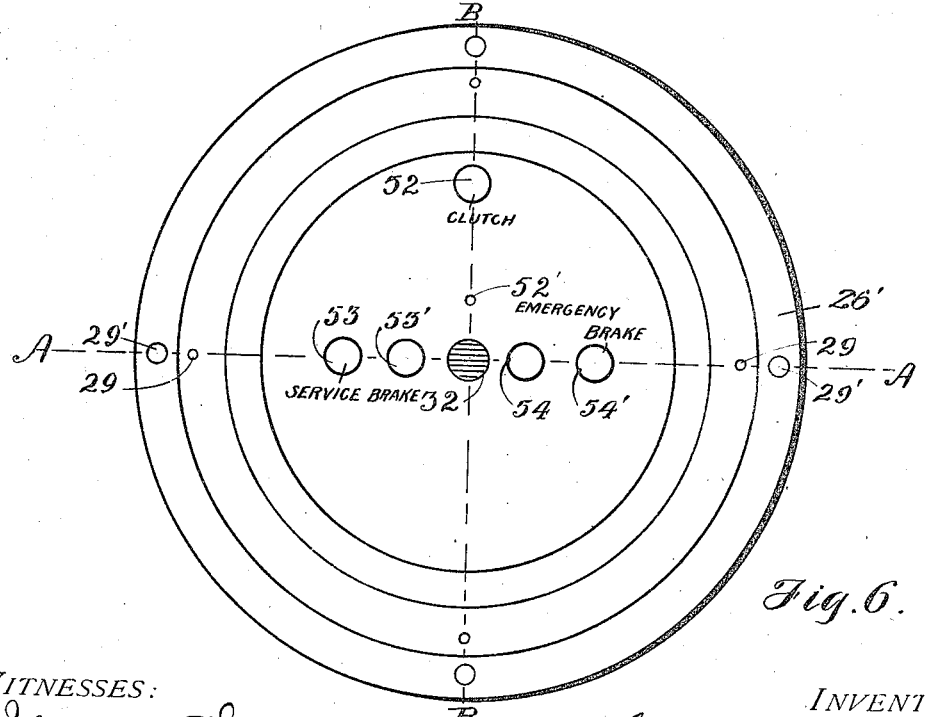

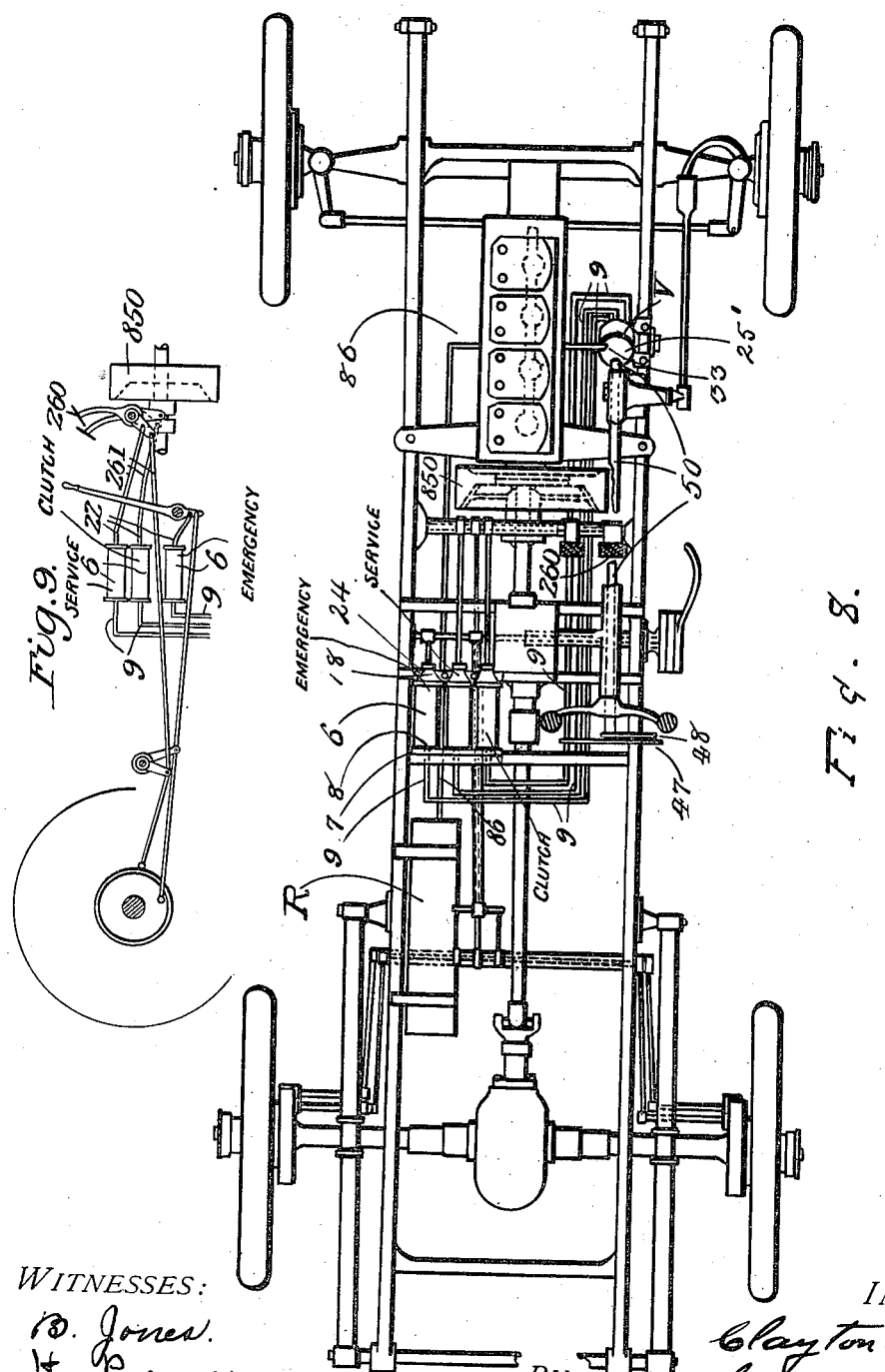

UNITED STATES PATENT OFFICE.

CLAYTON WEAVER, OF PHALANX, OHIO.

AIR-VALVE.

1,166,503.  Specification of Letters Patent.  Patented Jan. 4, 1916.

Application filed January 26, 1912. Serial No. 673,582.

*To all whom it may concern:*

Be it known that I, CLAYTON WEAVER, a citizen of the United States of America, residing at Phalanx, in the county of Trumbull and State of Ohio, have invented certain new and useful Improvements in Air-Valves, of which the following is a specification.

My invention relates to improvements in air valves for operating brakes and clutches of automobiles and other vehicles which carry means for compressing air or other fluids; and the objects of my improvement are, first, to provide more efficient means for stopping or retarding moving machines; second, to provide means for operating brakes on automobiles or cars by the use of compressed air; third, to enable the chauffeur of an automobile or the motorman of a car to release the clutch mechanism, thereby throwing the motive power out of action prior to or during the operation of the brake mechanism; fourth, to locate manually operated means for releasing the clutch and setting the brakes at a convenient and readily accessible part of the vehicle; fifth to provide means wherewith persons of minimum strength can as completely and easily control automobiles and cars as can stronger persons; sixth, to reduce the danger and loss of human life resulting from collisions between moving vehicles to a minimum; and, seventh, to do away with the cost, complications and inconveniences had in the use of clutches, hand brakes and foot brakes requiring a multiplicity of levers and more or less constant mental effort for their operation.

A further object is to provide an easily adjusted multiple valve for the purpose of admitting to and shutting off compressed air, or other fluid, from locations where it may be advantageous to use compressed air as a force or as a mechanical unit.

I attain these objects by the mechanism illustrated in the accompanying drawings in which:—

Figure 1 is a sectional view of an air chamber operated by my mechanism; Fig. 2 is a section through the middle of one form of my valve, inclosed in its case, on the line A—A of Fig. 6; Fig. 3 is a section through the valve without its case, taken on the line B—B of Fig. 6; Fig. 4 is a top plan view of the rotary valve looking down; Fig. 5 is a bottom plan view of the same looking up; Fig. 6 is a plan of the valve seat; Fig. 7 is a plan of an arcuate registering bar; Fig. 8 is a plan view of an automobile chassis with the steering wheel shown in section and the hollow steering post and the operating rod for my valve improvement shown broken away and with the other members of my improvement located thereon; and Fig. 9 is an elevational view of certain of the parts shown in Fig. 8 and illustrating the connection between the operating levers, the air cylinders and the clutch and brake.

Similar characters refer to similar parts throughout the several views.

It is immaterial whether the brakes are arranged to be operated by foot or by hand power, nor what form of clutch is adopted, since the brakes and the clutch have operating rods connected to them, and my improvements are connected with and are in part attached to the connecting, operating rods.

In carrying out my invention I provide a hollow receptacle best shown in Fig. 1 which, for convenience, I illustrate and describe as a cylinder 6, on which is threaded a head 7, having an air hole 8 in one end, through which I connect the end of a tube, 9, held in place by means of a threaded cap 10.

Within the cylinder 6 is a stem 12 passing through the center of a head H, which latter consists of a plate 13, a plate 15, and a washer 14, held together by screws 17, said parts being rigidly attached to the stem 12 by a threaded bur 16. The plate 13 is of the diameter of the inside of the cylinder 6, and the washer is slightly larger than the plate 15 so that the periphery of said washer may overlap that of the said plate 15, and make an air tight joint with the inside of the cylinder 6. On the other end of the cylinder 6 I thread a head 18, of compact and convenient shape, which has a central hole 19, for the entrance of the tube 22 in which is located the stem 12. A small air vent 20, which I prefer to bend backward in gooseneck shape, with its opening or mouth inclosed within a bell-like cavity 21 is attached to the head 18; the purpose of this construction being to allow the air behind the head plate 13, within the cylinder 6 to freely escape; and also to prevent the entrance of dust therein, as much as possible. I further partly close the mouth of the vent 20 with a fine screen 21'.

The stem 12 is loosely incased as above intimated in the tube 22 extending from the head H, beyond the end of the stem as shown and attached, at its end 25, in any suitable way, as by a bolt 26, directly to the operating rod 261 of the clutch, or of the brakes as the case may be. This construction it will be seen provides a tube 22 which may freely slide over the rod 12 when pulled by the rod 261 toward the right as seen in Fig. 1, without moving the piston head H. On the other hand should the piston head H be moved under the pressure of air admitted through the pipe 9, the rod 12 will move toward the right as seen in Fig. 1 and carry with it the tube 22 and the actuating rod 261. In other words it will be clear from the mechanism now disclosed that the sleeve or tube 22 and rod 12 constitute a sort of sliding connection which permits an operating lever such as the service foot lever 260 to be pushed toward the right as seen in Fig. 9 for example and thereby operate the brakes or other mechanism without regard to the air pressure in cylinder 6. On the other hand should it be desired to operate the same parts through air pressure without otherwise moving a foot lever such as 260, it is only necessary to open the valve V described below, whereupon the said air pressure will move the piston H and operating rod 261 and thus likewise operate the brakes or other mechanism. Stated in other words, the sliding connection between the sleeve 22 and rod 12 permits of the use of a hand or foot brake as well as of the use of an air operated brake or other mechanism.

23 is an air tight packing about the tube 22, and is retained in position by a nut 24 threaded to the end of head 18. A spring S, coiled about the tube 22 between the head H and cylinder head 18, serves to return the head H to the end 7 of the cylinder 6 when the air pressure is removed. The air tube 9 is led directly to the valve V, which is fully described below and with which an air tight coupling is made.

One complete operating cylinder 6 such as has been described, is used with and is attached to the clutch mechanism and one to each brake, or other mechanism of which pneumatic control is desired.

When the valve V is opened and the compressed air is admitted to the cylinder 6, in front of the piston head H, the latter is driven toward the head 18, carrying the stem 12 and the tube 22 with it and pushing the operating rod 261 of the clutch or of a brake that may be attached to the bolt 26 as above stated, thus producing the same result as if the rod had been operated by a hand or foot lever; the air in the cylinder behind the piston head H is forced out of the vent 20 and the coiled spring S is compressed. When the air in cylinder 6 is released the spring S returns the piston H to the forward end 7 of the cylinder. The air may be held compressed in the cylinder by the operator by means hereinafter explained, or he may release it at will and disengage the clutch or brake in doing so, or he may lock the clutch or brake by the hand or foot levers, prior to releasing the air from cylinder 6.

The valve V is provided with a valve case 25' and also with a base 26', Fig. 2, preferably circular in form and having an extended periphery for the purpose of forming an annular shelf 27, on which is seated the cover or casing 25'. The case is attached to the shelf 27, in an air tight manner as by screws 29, preferably with a packing, and I may provide ground faces when desired. The valve case 25' can be attached to a convenient part of the chassis or floor of a car as by bolts 29'. Prior to fastening on the cover 25' the upper member 30 of the valve V is seated on the base 26'. Said member 30 is provided with a central depression 31 fitted over a peg 32, centered in said base 26'.

33 is an opening in the valve case for the admission of compressed air conducted by a suitable tube 86 from a reservoir R, conventionally shown in Fig. 2. The air is forced into the reservoir R and there compressed by the use of any suitable pump, not shown.

36 is a stem with a doweled end 40 which fits into a depression 42, in the center of the said upper member, 30 of the valve. Above the end 40 the sides of the stem 36 are preferably slightly beveled to form an end 41, trapezoidal in cross section, that fits into a corresponding trapezoidal recess 41'; see Figs. 2 and 3 between two blocks 35, 35 integral with the upper member 30 of the valve. A disk 38, is attached to the stem and rests on the tops of blocks 35, 35, affording a base for a coiled spring 39 surrounding the stem and impinging against its annular collar 43 which supports a washer 44, fitting the upper interior of the casing 25'.

The functions of the parts just described are as follows: The end 40 serves as a vertical axle for the rotation of the upper valve member 30. The wedge like end 41 of the stem 36 serves to guide said end into the hole or depression 42; and to retain the stem in position while said stem rotates the upper valve member 30 as will more fully appear below. The coiled spring 39 keeps the parts positioned. Attached to the upper end of the stem 36 is a rod 50 see Figs. 2, 7 and 8, which passes loosely through the center of the arcuate registering bar 47 which is preferably located on the steering post. A control lever 48 is rigidly attached to said rod 50 and freely swings across the face of the bar 47 to one side or the other for the purpose of oscillating the member 50 the stem 36 and the upper member 30 of the valve over the base 26'. This movement of the member 30 admits air to the various cylinders 6 as will be more clearly set forth below.

Either under or over the steering wheel of the automobile and preferably in a plane parallel to said wheel the registering bar 47 above mentioned is positioned; and preferably so positioned that its arc readily centers on the said rod 50, as will be readily understood by those skilled in the art. A dog 49 controlled by a spring not shown may be attached to the control lever 48 see Fig. 7 and this dog is adapted to register with notches 56$^a$, 56$^b$, 57$^a$, 55$^b$, 52$^b$, etc., in said member 47 for the purpose of controlling the air passing through valve V to the various cylinders 6.

From the mechanism so far disclosed it will now be understood that a cylinder such as 6 is located near the clutch and also one is located near each of the brakes. Their stems 12 loosely fit the tubes 22, and the latter being connected with the rods 261 are arranged to operate the clutch and brakes whenever air is admitted to the cylinders 6, while the manual operation of the foot levers such as 260 will operate the clutch or brakes independently of the air cylinders 6.

In order to admit air to the cylinders 6 and at the same time control this admission, the tubes 9 entering said cylinders are connected with ports carried by the valve base 26' as will be more fully disclosed below. The valve provided with the casing 25' is preferably located at or near the lower end of the steering rod as indicated in Fig. 8 and the valve itself is operated by turning the rod 50 as above stated, although on some automobiles of course it will be otherwise placed. The control lever 48 coöperating with the bar 47 serves to indicate to the operator just what ports in the valve are opened, and therefore just what mechanisms are being operated by air pressure at any particular time.

The construction of the valve will now be disclosed, especial reference being had to Figs. 2, 3, 4, 5, 6 and 7. Fig. 5 is a bottom view of the valve member 30 while Fig. 4 is a top view thereof, it being borne in mind that when the top member 30 and bottom member 26 are assembled the hole 74' in the top member 30 will register with the hole 54' of the bottom member 26'. Further the hole 74 of the top member 30 will at the same time register with the hole 54 of the bottom member 26'. The holes 74 and 74' of the top member 30 are further connected by the cross passage 54'', so that air passing into the hole 54' for example will readily pass out of the hole 54 and vice versa as will be clear from an inspection of Fig. 2. In the same way when the parts are positioned as just described the holes 73 and 73' of the top member 30 which are connected by the short passage 53'' will register respectively with the holes 53 and 53' of the bottom member 26', so that air passing into the hole 53 will pass out of the hole 53' and vice versa.

In addition to the above holes or ports in the respective members the holes 55, 56, 58 and 59 pass entirely through the upper member 30, as well as the arc shaped opening 57 which is approximately 25° in length, the arc shaped opening 60 which is approximately 50° in length and the arc shaped opening 61 which is approximately 70° in length. The arc shaped opening 57 is so located that it lies in the circle containing the said holes 55 and 56 as well as the holes 58 and 59. In addition to this the arc shaped openings 60 and 61 are located on a circle outside of the circle containing the said holes 55, 56, 58 and 59 and in quadrants removed 90° from the opening 57 as will be clear from Fig. 5 of the drawings. The said holes 73, 73', 74 and 74' are located on a diameter of the valve member 30 and the said holes 52'' and 52''' are located on a radius perpendicular to said diameter as will be clear from Fig. 5 of the drawings. The relative location of the holes 53, 53', 54, 54', 52, 52' will be clear from Fig. 6 of the drawings and from this figure it will be seen that their locations are such that they are adapted to register respectively with the holes 73, 73', 74, 74', 52'' and 52''', when the valve members 30 and 26' are brought into the proper positions. The valve members being constructed as just described the end 80 of the particular tube 9 that is adapted to serve one of the brake cylinders may be suitably attached to the hole 53 while the end 81 of that tube 9 which is adapted to serve an emergency brake cylinder may be attached to the opening or port 54' as will be clear from Fig. 2 of the drawings. When the ends 80 and 81 of the said tubes 9 are thus attached the other ends of said tubes may be attached to their respective air cylinders 6 as will be readily understood.

Referring more particularly to Fig. 3 the opening 52 may be connected with the end 85 of that particular tube 9 and air chamber 6 which connects with and operates the clutch 850. Said connection is conveniently provided with a cock or faucet comprising a hollow neck 82, a perforated spigot member 83 and a handle 84. The said handle 84 may be operated from the dash board of an automobile by any convenient mechanical connection so as to close the passage 52 and prevent the throwing out of the clutch by means of compressed air whenever it is desirable.

From the construction so far disclosed it will now be clear that the parts of the valve being assembled as described and the valve casing 25 filled with compressed air from the reservoir R and the control lever 48 being located centrally as shown in Fig. 7, the valve member 26′ and the upper valve member 30 will be positioned as shown in Figs. 2 and 3. In these positions all the ports leading to the clutch and brake cylinders will be closed from the entrance of compressed air from above the member 30. In the position shown in Fig. 2 the ends 80 and 81 of the tubes 9 leading to the service and emergency brakes respectively are open at the ports 53′ and 54 so that the air in front of the piston heads H in their corresponding air chambers 6 is vented to the atmosphere, and the said piston heads H have been returned by their corresponding springs S, leaving the brakes fully released. In the same way the air from the clutch cylinder 6 can pass through the tube end 85 to the hole 52 and out of the hole 52′ best illustrated in Fig. 3. It therefore follows that in the positions shown the clutch is disengaged, while the brakes are released.

In order for the chauffeur to engage the clutch he will release the dog 49, Fig. 7 and push control lever 48 toward the right as shown in said figure until the said dog catches in the notch 52ª. When this motion takes place the top valve member 30 will be thereupon correspondingly rotated so that the end $x$ of the arc shaped opening 60 will overlap and register with the hole 52 of the base 26′, as will be clear from Figs. 3, 4, and 6.

The parts having assumed the position just described, the compressed air above the member 30 will pass through the opening 60 and the port 52, and enter the tube end 85 attached to the faucet. Air will thus be led to the air chamber 6 corresponding to the clutch, and the clutch rod 261 will be forced forward by its corresponding piston head H thus throwing off the clutch.

Should the chauffeur desire to apply the service brake the lever 48 will be moved to the notch 55ª thus rotating the member 30 far enough to cause the small hole 55 to register with the hole 53 of the lower member 26′, whereupon the compressed air will pass through the tube end 80 to the particular air chamber 6 operating the rod 261 of the said brake.

When it is desired to secure only a slight braking action, as when going down a hill for instance, the lever 48 having been brought to the notch 55ª as just described, and a relatively small air pressure of a few pounds having been let into the cylinder 6 corresponding to the said brake, the chauffeur will return the lever to the notch 55ª thus cutting off a further supply of air. The compressed air thus admitted to the proper cylinder will exert a slight pressure on the brake, which pressure may be increased at will by fully manipulating the lever 48.

If a very quick braking action is desired the lever 48 will be moved to the notch 56ª thus rotating the member 30 so that the larger hole 56, Fig. 5 registers with the hole 53 and the full air pressure is then sent to operate the service brake through the tube end 80, of the proper tube 9.

At the stage of operation just described the hole 52 leading to the clutch will register with the end $w$ of the opening 60, Fig. 4 so that the clutch will still be off. In case it is desired to stop quickly the lever 48 is moved to the notch 57ª, thus rotating the member 30 so that the large hole 57 registers with the hole 53, whereupon the hole 58 will register with the hole 54′ setting both the service and emergency brakes, and closing the port or hole 52 which leads to the clutch. On the other hand, if the chauffeur moves the lever 48 to the right, so that it stops at the notch 52ᵇ, the valve member 30 will be rotated in the direction the reverse of that just described, and the hole 52 in the member 30 will register with the end $y$ of the hole 61, Fig. 4, whereupon compressed air will be admitted to the clutch operating cylinder only. Should it be desired to only slightly apply the emergency brake, this may be accomplished by moving the lever 48 to the notch 55ᵇ when the hole 59 will register with the hole 54′, and thereby admit air to the tube end 81 of the particular tube 9 to control said emergency brake. The hole 59 being of small dimensions not sufficient air will be admitted to suddenly apply the said brake. On the other hand should it be desired to more firmly apply the said brake, the chauffeur will continue the motion of the lever 49 until it reaches the notch 56ᵇ, when the larger hole 57 will register with the hole 54, letting the full pressure go to the operating mechanism of the brake and leaving the end $z$ of the hole 61 still registering with the hole 52 leading to the clutch.

It is obvious that those skilled in the art may vary the details of construction as well as the arrangement of parts without departing from the spirit of my invention, and therefore I do not wish to be limited to the above disclosure except as may be required by the claims.

What I claim is:—

1. In a motor vehicle the combination of a brake mechanism; a clutch mechanism; a rod for operating each of said mechanisms; manually controlled means for operating each of said rods; an air cylinder for said brake mechanism; an air cylinder for said clutch mechanism; a piston in each of said cylinders; means for admitting compressed air behind each of said pistons; and a sliding connection between each of said rods and said pistons adapted to permit the manual operation of said brake and clutch mechanisms without affecting said pistons and to also permit the operation of said brake and clutch mechanisms by admitting compressed air behind said pistons, substantially as described.

2. In a motor vehicle the combination of a plurality of brake mechanisms; a clutch mechanism; a rod for operating each of said mechanisms; manually controlled means for operating each of said rods; an air cylinder for each of said brake mechanisms; an air cylinder for said clutch mechanism; pistons in each of said cylinders; means comprising a manually controlled valve for admitting compressed air behind each of said pistons at will; and a sliding connection between each of said rods and said pistons adapted to permit the independent manual operation of said brake and clutch mechanisms without affecting said pistons and to also permit the independent operation of said brake and clutch mechanisms by admitting compressed air behind said pistons, substantially as described.

3. In a motor vehicle provided with a control mechanism; a rod for operating said control mechanism; a manually operated member for moving said rod; an air cylinder provided with a piston having a guide stem; a tube slidingly fitting said stem; a connection between said tube and said rod; means to admit compressed air behind said piston to move said tube and rod; means to return said piston without moving said tube and rod; a valve mechanism for controlling the admission of air to said piston and cylinder; and means under the control of the operator for moving said valve, substantially as described.

4. In a motor vehicle provided with a plurality of control mechanisms; an operating rod for each mechanism; a manually operable member for each rod; an air cylinder having a piston for each rod; a tube connected to each rod and slidingly connected to each piston; means to admit compressed air behind each piston for moving said tube and rod; means for returning each piston without moving its tube and rod; a valve having a plurality of ports adapted to govern independently the admission of air to said cylinders and pistons; and means under the control of the operator for controlling said ports at will, substantially as described.

5. In a motor vehicle provided with a plurality of control mechanisms provided with pistons, the combination of an operating rod for each mechanism; a manually operable member for each rod; a tube connected to each rod and slidingly connected to each piston; means to admit compressed air behind each piston for moving said tube and rod, comprising an independent pipe leading into the base of each cylinder; means comprising a spring for returning each piston without moving its tube and rod; a valve comprising a pair of disk like members each having a plurality of ports adapted to govern independently the admission of air to said cylinders and pistons; and means comprising an arc like member and a lever coacting therewith under the control of the operator for controlling said ports at will, substantially as described.

6. In a motor vehicle the combination of a steering wheel; a brake; a clutch; manually operated levers and rods for independently controlling said brake and clutch; an air cylinder and piston for said brake; an air cylinder and piston for said clutch; a slipping connection between each of said pistons and each of said rods by which said levers may operate said rods without moving said pistons; a valve provided with a plurality of ports and located near said steering wheel; independent pipe connections controlled by said valve for the admission of compressed air to each of said pistons at will to move each of said rods; and a lever and graduated arc for moving said valve to any desired position, substantially as described.

7. In a motor vehicle the combination of a steering wheel; a brake; a clutch; manually operated levers and rods for independently controlling said brake and clutch; an air cylinder and piston for said brake; an air cylinder and piston for said clutch; a slipping connection between each of said pistons and each of said rods by which said levers may operate said rods and without moving said pistons; a valve provided with a casing and a pair of disk like members each having a plurality of ports and located near said steering wheel; independent pipe connections controlled by said valve for the admission of compressed air to each of said pistons at will and thereupon move each of said rods; springs in said cylinders for returning said pistons without moving said rods; and a lever and graduated arc located near said steering wheel for moving said valve to any desired position, substantially as described.

8. The combination with a manually operable valve having a plurality of ports; a compressed air reservoir; a tubular connection between said reservoir and said valve; air tight cylinders; tubular connections between said valve and said airtight cylinders; piston heads in said cylinders; piston rods attached to said piston heads; sliding tubes loosely sleeved on said piston rods; clutch and brake mechanisms; operating rods connected at their outer ends with said clutch and brake mechanisms and at their inner ends with said sliding tubes; a spring surrounding each tube within each cylinder and bearing against each piston head and the opposite head of each cylinder; and a vent in each cylinder head, substantially as described.

9. In a motor vehicle provided with brake and clutch mechanisms; compressed air operated means for controlling said mechanisms comprising a valve provided with a pair of disks having openings adapted to be brought into register with each other; a stem rising from one of said disks; a casing inclosing said disks and stem; a source of compressed air entering said casing; a lever for oscillating said stem and its associated disk; a graduated arc member for indicating the ports brought into register by the movements of said lever; means for manually operating said brake and clutch mechanisms independently of said valve; and a slipping connection between said compressed air operating means and said manually operating means, substantially as described.

10. In a motor vehicle provided with brake and clutch mechanism; compressed air operated means for controlling said mechanisms comprising a valve provided with a pair of disks having round and elongated openings of different capacities adapted to be brought into register with each other; a stem rising from one of said disks; a casing inclosing said disks and stem; a source of compressed air entering said casing; tubes leaving said valve; cylinders connected to said tubes; a lever for oscillating said stem and its associated disk; a graduated arc member for indicating the ports brought into register by the movements of said lever; means for manually operating said brake and clutch mechanisms independently of said valve; and a slipping connection between said compressed air operating means and said manually operating means, substantially as described.

In testimony whereof I affix my signature in presence of two witnesses.

CLAYTON WEAVER.

Witnesses:
HELEN FLODEN,
J. B. COLE.